US011651205B2

(12) United States Patent
Terjek

(10) Patent No.: US 11,651,205 B2
(45) Date of Patent: May 16, 2023

(54) METHOD FOR TRAINING A GENERATIVE ADVERSARIAL NETWORK (GAN), GENERATIVE ADVERSARIAL NETWORK, COMPUTER PROGRAM, MACHINE-READABLE MEMORY MEDIUM, AND DEVICE

(71) Applicant: Robert Bosch GmbH, Stuttgart (DE)

(72) Inventor: David Terjek, Marcali (HU)

(73) Assignee: ROBERT BOSCH GMBH, Stuttgart (DE)

( * ) Notice: Subject to any disclaimer, the term of this patent is extended or adjusted under 35 U.S.C. 154(b) by 324 days.

(21) Appl. No.: 16/874,636

(22) Filed: May 14, 2020

(65) Prior Publication Data
US 2020/0372297 A1 Nov. 26, 2020

(30) Foreign Application Priority Data

May 23, 2019 (DE) .......................... 102019003612.3
Jul. 11, 2019 (DE) .......................... 102019210270.0

(51) Int. Cl.
*G06N 3/08* (2023.01)
*G06K 9/62* (2022.01)

(52) U.S. Cl.
CPC ......... *G06K 9/6234* (2013.01); *G06K 9/6256* (2013.01); *G06N 3/08* (2013.01)

(58) Field of Classification Search
None
See application file for complete search history.

(56) References Cited

U.S. PATENT DOCUMENTS

| 5,544,280 | A  | * | 8/1996 | Liu ..................... | G06N 3/0675 706/30 |
| 10,614,557 | B2 | * | 4/2020 | Lin ..................... | G06N 3/04 |
| 10,624,558 | B2 | * | 4/2020 | Ceccaldi ............. | G06N 3/084 |
| 10,678,256 | B2 | * | 6/2020 | Schulter .............. | G06T 7/11 |
| 10,789,755 | B2 | * | 9/2020 | Amer .................. | G06F 40/30 |

(Continued)

OTHER PUBLICATIONS

Ishaan Gulrajani, et al., "Improved Training of Wasserstein GANs", Cornell University, 2017, pp. 1-20.

(Continued)

*Primary Examiner* — Tsung Yin Tsai
(74) *Attorney, Agent, or Firm* — Norton Rose Fulbright US LLP; Gerard Messina

(57) ABSTRACT

A method for training a generative adversarial network, in particular a Wasserstein generative adversarial network. The generative adversarial network includes a generator and a discriminator, the generator and the discriminator being artificial neuronal networks. The method includes training the discriminator. In the step of training the discriminator, a parameter of the discriminator is adapted as a function of a loss function, the loss function including a term that represents the violation of the Lipschitz condition as a function of a first input datum and a second input datum and as a function of a first output of the discriminator when processing the first input datum and a second output of the discriminator when processing the second input datum, the second input datum being created starting from the first input datum by applying the method of the virtual adversarial training.

9 Claims, 2 Drawing Sheets

(56) References Cited

U.S. PATENT DOCUMENTS

| | | | |
|---|---|---|---|
| 10,943,352 B2* | 3/2021 | Sun | G06V 10/764 |
| 11,037,531 B2* | 6/2021 | Kaplanyan | G06F 3/147 |
| 2019/0049540 A1* | 2/2019 | Odry | G06N 3/084 |
| 2019/0096125 A1* | 3/2019 | Schulter | G05D 1/0088 |
| 2019/0114748 A1* | 4/2019 | Lin | G06T 5/005 |
| 2019/0128989 A1* | 5/2019 | Braun | G06N 3/08 |
| 2019/0197670 A1* | 6/2019 | Ferrer | G06V 10/764 |
| 2019/0287283 A1* | 9/2019 | Lin | G06T 11/60 |
| 2019/0302290 A1* | 10/2019 | Alwon | G01V 99/005 |
| 2019/0355102 A1* | 11/2019 | Lin | G06V 10/7715 |
| 2020/0193607 A1* | 6/2020 | Sun | G06V 10/82 |
| 2020/0320704 A1* | 10/2020 | Zheng | G06N 3/08 |
| 2020/0349449 A1* | 11/2020 | Wang | G06T 5/50 |
| 2020/0372297 A1* | 11/2020 | Terjek | G06N 3/0454 |
| 2021/0125583 A1* | 4/2021 | Kaplanyan | G06F 3/147 |
| 2021/0271968 A1* | 9/2021 | Ganin | G06N 3/0445 |

OTHER PUBLICATIONS

Takeru Miyato, et al., "Virtual Adversarial Training: A Regularization Method for Supervised and Semi-Supervised Learning", Cornell University, 2018, pp. 1-16.

* cited by examiner

METHOD FOR TRAINING A GENERATIVE ADVERSARIAL NETWORK (GAN), GENERATIVE ADVERSARIAL NETWORK, COMPUTER PROGRAM, MACHINE-READABLE MEMORY MEDIUM, AND DEVICE

CROSS REFERENCE

The present application claims the benefit under 35 U.S.C. § 119 of German Patent Application No. DE 102019003612.3 filed on May 23, 2019, and German Patent Application No. DE 102019210270.0 filed on Jul. 11, 2019, which are both incorporated herein by reference in their entireties.

FIELD

The present invention relates to a method for training a generative adversarial network (GAN), a generative adversarial network, a computer program, a machine-readable memory medium, and a device.

BACKGROUND INFORMATION

Generative adversarial networks (GANs) are methods of unsupervised machine learning. GANs include two artificial neuronal networks: a generator and a discriminator.

The input that the generator typically receives is random noise. In most cases it is subject to normal distribution having an expected value of 0 and a variance of 1. The generator is configured to generate outputs in a format that corresponds to a predefined format or may be assigned to a predefined domain.

The discriminator is configured in such a way that it is capable of differentiating between real or original and generated data. Those data are considered real data, with the aid of which the generator was trained. As generated data, those data are valid that were generated by the generator.

The output of the discriminator is used as a training signal for the generator when entering the generated data. In this case, the objective is to train the generator in such a way that it is enabled to generate data that can no longer be recognized as generated data by the discriminator (and may thus be wrongly classified as real or original data).

So-called Wasserstein GANs (WGANs) are described in "Improved Training of Wasserstein GANs" by Ishaan Gulrajani, Faruk Ahmed, Martin Arjovsky, Vincent Dumoulin, Aaron Courville. These are based on the theory of optimal transport and represent the related art with regard to learning stability and quality of the results (samples) generated by the GAN.

Wasserstein GAN (WGAN) is different from the standard GAN (SGAN) with regard to several points. In contrast to SGAN, the output layer of an artificial neuronal network of a WGAN does not include any nonlinearities. In the case of SGAN, the output layer includes sigmoid functions in most cases. This means that even if the discriminator is trained almost optimally, the gradient that it outputs never reaches saturation.

In "Virtual Adversarial Training: A Regularization Method for Supervised and Semi-Supervised Learning" by Takeru Miyato, Shin-ichi Maeda, Masanori Koyama, Shin Ishii, a convention method for the field of semi-supervised machine learning, virtual adversarial training (VAT), is described for training artificial neuronal networks. This method is based on changing a given input datum in such a way that the output of the artificial neuronal network applied thereto changes significantly or in the most significant manner. The change is measured based on the output of the changed input datum as compared to the output of the original, i.e., unchanged, input datum. Within the scope of this method, the corresponding direction of the change in the input datum is to be ascertained or approximated, i.e., that brings about the desired significant or most signification change in the output. This direction is referred to as an adversarial perturbation direction or adversarial direction.

VAT uses the power iteration to approximate the adversarial direction of a specific artificial neuronal network.

SUMMARY

In theory, the discriminator must be a WGAN 1-Lipschitz. One function is K-Lipschitz, if the condition below is met. dx and dy are to be the metrics of the function domain and their co-domain, f is the discriminator of the WGAN, the metric of the domain is the L2 standard for images in most cases, the metric of the co-domain is the absolute difference between the scalar outputs and K approximately 1:

$$d_y(f(x_1),f(x_2)) \leq K d_x(x_1,x_2)$$

In practice, this is achieved for loss function with the aid of a condition (soft constraint) by adding a regularization term that represents the violation of the Lipschitz condition. This may be implemented by taking into consideration (penalty) the variable of the gradient of the discriminator at different points of the input (gradient penalty, GP). In general, this may be achieved through random interpolation between a real input and a generated input.

The present invention provides a method for training a generative adversarial network (GAN), the GAN including a generator and a discriminator, the generator and the discriminator being artificial neuronal networks.

An example embodiment in accordance with the present invention includes a step of training the discriminator, in the step of training the discriminator a parameter of the discriminator being adapted as a function of a loss function, the loss function including a term that represents the violation of the Lipschitz condition as a function of a first input datum and a second input datum and as a function of a first output of the discriminator when processing the first input datum and a second output of the discriminator when processing the second input datum, the second input datum being created starting from the first input datum by applying the method of the virtual adversarial training (VAT).

The method is particularly suitable for training the Wasserstein GAN.

By using the example method of the present invention, pairs (input, output) that are very likely to violate the Lipschitz condition may be generated with the aid of a GAN.

In the present case, an artificial neuronal network is to be understood to mean a network made of artificial neurons for processing information. Artificial neuronal networks essentially go through three phases. In an initial phase, a basic topology is predefined as a function of the task in most cases. This is followed by a training phase, in which the basic topology is trained with the aid of training data to efficiently solve the task. The topology of the network may also be adapted within the training phase. Training data are characterized in that the input data are typically available together with the desired output data. This is finally followed by an application phase, in which the trained network is applied to input data, for which there are no desired output data. The output data of the trained network then represent the sought-after output data according to the task.

In the present case, a parameter of a discriminator is primarily understood to mean a weight of the artificial neuronal network that represents the discriminator of the GAN. The adaptation of a hyperparameter of the GAN in general or of the discriminator in particular is additionally possible.

In the present case, a hyperparameter is understood to mean a parameter that does not describe the artificial neuronal network to be trained per se, but is used, for example, to control the training process of the network to be trained. A typical hyperparameter is the so-called learning rate that represents an indicator for the adaptation of the network per learning passage. A further common hyperparameter is the number of the training epochs. One epoch refers to one total passage of the training data.

According to one specific embodiment of the method of the present invention, the first input datum is retrieved either from a data memory for real training data or generated with the aid of the generator.

In the present case, real training data are understood to mean data that are used originally to train the GAN. Real training data are not data that are generated with the aid of the generator.

According to one specific embodiment of the example method of the present invention, the first input datum is changed into its adversarial direction for creation purposes while applying the method of the virtual adversarial training (VAT), the adversarial direction being approximated by applying the power iteration.

When applying the power iteration, the adversarial direction to be determined is first initialized using random values. Subsequently, these are iteratively replaced by the gradients with regard to the output of the artificial neuronal network, i.e., with regard to the output of the discriminator in the case of a changed input. A changed input may be understood to mean a datum generated with the aid of the generator or an original datum changed with the aid of the generator. The iterative replacement takes place in that the differences between an original input and a changed input are ascertained. The ascertainment may take place according to the L1 or L2 standard or according to the KL divergence or the like. The difference is fed back with the aid of backpropagation to obtain a derivation with regard to the change. The change is subsequently replaced by its gradient. The fixed point of this iteration is the sought-after adversarial direction. In practice, only one iteration is necessary therefor in most cases.

According to one specific embodiment of the example method of the present invention, the method includes a first step of training the generator and a second step of training the generator, multiple iterations of the step of training the discriminator being carried out between the first step of training the generator and the second step of training the generator.

According to one specific embodiment of the example method of the present invention, the discriminator is essentially 1-Lipschitz and optimal.

It is sufficient in this case, if the discriminator is nearly 1-Lipschitz and nearly optimal.

In the present case, the properties 1-Lipschitz and optimality are to be understood to mean the following relation.

The Wasserstein distance (metric) is a distance (metric) within the scope of the probability distributions. In the field of generative modeling, the objective is to learn a probability distribution. Generative adversarial networks (GANs) are conventional examples from the field of generative modeling, in which the probability distribution to be learned is represented by a predefined dataset and the learned probability distribution is represented by the generator of the GAN. Wasserstein GANs represent one specific embodiment of a GAN, in which the discriminator approximates or learns the Wasserstein distance between a real probability distribution (represented by the predefined dataset) and the generated probability distribution (represented by the generator, in which the data samples are retrieved from a predefined distribution and the generator converts these data samples into data samples that almost exactly match the probability distribution of the predefined dataset). This results from the following formula of the Wasserstein distance between two probability distributions $P_1$ and $P_2$.

$$W_1(P_1, P_2) = \sup_{\|f\|_L \leq 1} \mathbb{E}_{x \sim P_1} f(x) - \mathbb{E}_{x \sim P_2} f(x)$$

In this case, the supremum of function f is applied that has a Lipschitz standard of 1 or less; this means that the function is K Lipschitz with a K≤1. In the case of the Wasserstein GAN, function f is represented by the discriminator and must thus be regularized to be 1-Lipschitz. Various methods are available for the regularization. In addition to the present invention, it is conceivable to use the method of the gradient penalty for regularization purposes.

The term, whose supremum is looked for, represents the expected value of function f over probability distribution $P_1$ (in the case of Wasserstein GAN, this corresponds to the output of the discriminator, if real data from the predefined dataset are supplied) minus the expected value of function f over probability distribution $P_2$ (in the case of Wasserstein GAN, this corresponds to the output of the discriminator, if the data generated by the generator are supplied).

Against this background, optimality is understood to mean in the present case that function f actually achieves the supremum of the previously listed formula. In practice, this is typically not achievable using numerical optimization. It is typically sufficient for function f (consequently for the discriminator) to be nearly optimal (or approximately optimal).

In the present case, nearly optimal is understood to mean that the discriminator is optimized multiple times to the extent that it nearly approximates the actual supremum.

This similarly applies to nearly 1-Lipschitz in this context. It cannot be guaranteed 100% that the discriminator will be 1-Lipschitz through regularization (whether with the aid of the present invention or an alternative method). It is possible, however, to evaluate through a qualitative evaluation of empirical examples, whether the number of the optimization steps and the employed regularization method are sufficient to assume that the discriminator is nearly optimal and nearly 1-Lipschitz. Heuristics, such as Inception Score or Fréchet Inception Distance, may be alternatively applied for the evaluation of the generated samples.

A further aspect of the present invention is a generative adversarial network, the generative adversarial network including a generator and a discriminator, the generator and the discriminator being artificial neuronal networks. The generative adversarial network is trained with the aid of one specific embodiment of the method according to the present invention.

According to one specific embodiment of the generative adversarial network of the present invention, the discriminator is essentially 1-Lipschitz and optimal. It is sufficient in this case, if the discriminator is nearly 1 Lipschitz and nearly optimal.

Further aspects of the present invention include a computer program, a machine-readable memory medium as well as a device for controlling a technical system, in particular an autonomous system, in particular a vehicle controlled in an automated manner.

Specific embodiments of the present invention are explained below based on the figures.

DETAILED DESCRIPTION OF EXAMPLE EMBODIMENTS

Figure 1:
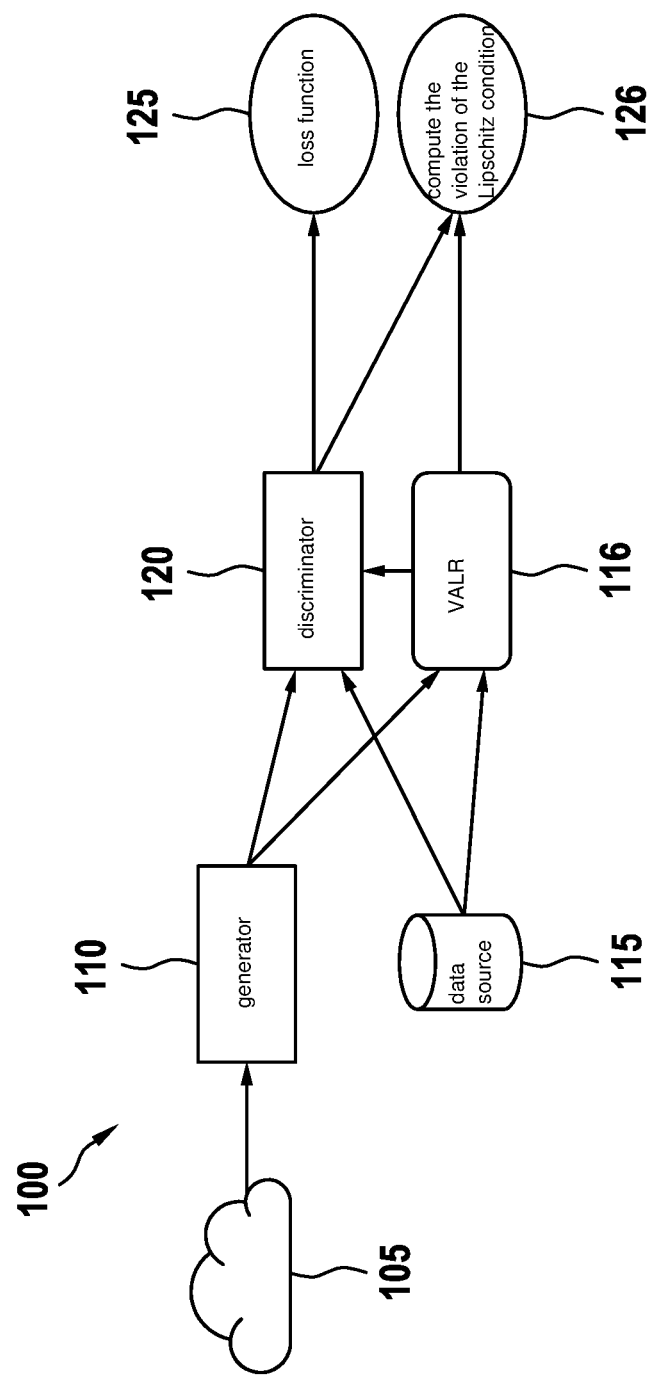
FIG. 1 shows a block diagram of a GAN, trained according to the present invention.

FIG. 1 shows a block diagram of a GAN 100, trained according to the present invention. GAN 100 illustrated in FIG. 1 includes a generator 110 and a discriminator 120. Generator 110 is initialized with a random number 105 that may be retrieved from a random distribution 105 and is designed in such a way that generator 110 generates results (fake samples) that match a predefined domain. A normal distribution having an expected value 0 and a variance 1 may be used as random distribution 105. Other random distributions, in particular those that are adapted to the particular application, are also possible. From a data source 115, real training data are provided from the corresponding domain. Generator 110 is typically implemented with the aid of an artificial neuronal network.

Discriminator 120 may be supplied with real training data from data source 115 and training data generated with the aid of generator 110. Discriminator 120 is configured in such a way that it evaluates the inputs with regard to the fact whether the inputs may be assigned to the target domain.

The evaluation of the input is output by discriminator 120 as a result of a loss function (adversarial loss) 125.

In the case of a Wasserstein GAN, the loss function may be illustrated as follows:

$$\min_{g} \max_{\|f\|_L \le 1} \mathbb{E}_{z \sim \mathbb{P}_z} f(g(z)) - \mathbb{E}_{x \sim P_r} f(x)$$

Generator g minimizes this term and discriminator f, which is limited to functions that are 1-Lipschitz, maximizes this term. The minimization over different possibilities of functions g means that generator g is trained to minimize this loss function. The maximization over different possibilities of functions f, which are 1-Lipschitz, means that discriminator f is trained to maximize this loss function and thus to minimize a regularization loss portion that represents the violation of the 1-Lipschitz condition. The example method of the present invention may be for example applied for this minimization in addition to other alternatives, such as for example the method of the gradient penalty.

The first expected value of the term stated above is drawn from samples z, which are supplied to generator g to generate generated samples g(z), through probability distribution $P_z$, which is typically a predefined distribution (for example the normal distribution). Generated samples g(z) are supplied to discriminator f to obtain evaluation f(g(z)) representing the similarity to the real samples.

The loss function of the present invention is minimized in this case by generator 110 according to the term below and maximized by discriminator 120.

$$\min_{G} \max_{D \in \mathcal{D}} \mathbb{E}_{x \sim \mathbb{P}_r} [D(x)] - \mathbb{E}_{\tilde{x} \sim \mathbb{P}_g} [D(\tilde{x})]$$

Here, G represents generator 110 of the present invention. D represents discriminator 120 to be trained from quantity $\mathcal{D}$ of the discriminators in question. $\mathbb{P}r$ represents the probability distribution of the training dataset. $\mathbb{P}_g$ represents the probability distribution of generator 110. By training discriminator 120 to maximize this loss function, the approximated Wasserstein distance between probability distribution $\mathbb{P}_r$ of the training dataset and probability distribution $\mathbb{P}_g$ of generator 110 is minimized. In this way, the probability distribution of the training dataset is approximately reinstated, which generally corresponds to the objective of generative modeling.

According to the present invention, real training data from data source 115 and training data generated with the aid of generator 110 may be supplied. In component VALR 116, the adversarial direction is ascertained with the aid of the power iteration. The latter is used to change the input data of the component, that is either starting from real training data or from training data generated with the aid of generator 110, into the ascertained adversarial direction and to output these as output data to discriminator 120 and for computing the violation of Lipschitz condition 126. To compute the violation of the Lipschitz condition, the output of discriminator 120 is furthermore supplied.

Loss function 125 is computed starting from the output of discriminator 120. In general, a loss function 125 may be regularized by incorporating a corresponding term. A corresponding regularization term is typically added for this purpose to the result of the loss function with the aid of a hyperparameter for the purpose of controlling the influence of the regularization term. For example, the gradient formation may be controlled in this way, so that the GAN to be trained does not reach a saturation of the gradient excessively quickly, thus impairing the training progress.

If the GAN to be trained is a Wasserstein GAN, then discriminator 120 must be at least nearly 1-Lipschitz. Achieving this in practice requires a lot of effort. A first efficient possibility of achieving this condition for discriminator 120 is known under the term gradient penalty (GP). GP is based on the knowledge that the supremum of the gradient of a function f corresponds to its smallest Lipschitz constant. The below term expresses that:

$$\mathbb{E}_{x \sim P_i} (\|\nabla_x D(x)\|_2 - 1)^2$$

Here, $\mathbb{E}_{x \sim P_i}$ represents the expected value over Pi that represents a random quantity of samples pulled from the training dataset and generated by generator 110. D stands for discriminator 120. By minimizing this term, discriminator 120 is regularized to the extent that its standard is 1. This in turn means that the discriminator arrives near 1-Lipschitz.

The example method of the present invention takes a different approach in this case and regularizes the violation of the Lipschitz condition explicitly and not indirectly via the regularization of the gradient. The below term represents the Lipschitz standard that should be 1 within the scope of the present invention:

$$\|f\|_L = \sup_{x,y \in X; x \neq y} \frac{d_Y(f(x), f(y))}{d_X(x, y)}$$

According to the present invention, loss function 125 may be regularized as a function of the computation of the violation of Lipschitz condition 126. This may be achieved by replacing the regularization term for the so-called gradient penalty by the below term for illustrating the violation of the Lipschitz condition.

$$\mathbb{E}_{x,y \sim P_T}\left[\left(\frac{|D(x) - D(y)|}{\|x - y\|_2} - 1\right)_+^2\right]$$

This regularization term is minimized with the aid of the method of the present invention. Here, only the positive portion of the difference is further used. In this way, the term is only not zero if a violation of the Lipschitz condition is present and remains zero if the quotient remains below 1.

The expected value is over PT, meaning that a sample y is derived from a sample x by applying the method of the virtual adversarial training, a sample x originating either from the training dataset or from a sample generated by generator 110. This is the core of the present invention; if samples x and y were to be drawn only randomly, the above term would not be near the supremum of the term of the Lipschitz standard.

Figure 2:
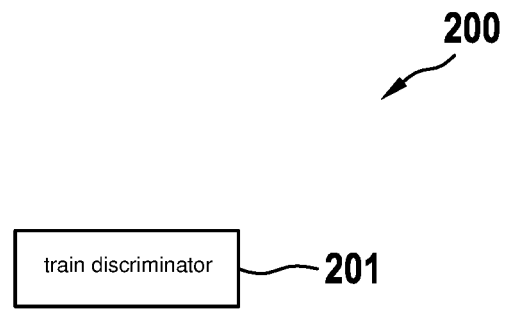
FIG. 2 shows a flow chart of a training method according to the present invention.

FIG. 2 shows a flow chart of one specific embodiment of the method for training an artificial neuronal network according to the present invention.

In step 201, the discriminator is trained, in the step of training the discriminator a parameter of the discriminator being adapted as a function of a loss function, the loss function including a term that represents the violation of the Lipschitz condition as a function of a first input datum and a second input datum as well as a function of a first output of the discriminator when processing the first input datum and a second output of the discriminator when processing the second input datum, the second input datum being created starting from the first input datum by applying the method of the virtual adversarial training.

What is claimed is:

1. A method for training a Wasserstein generative adversarial network, the generative adversarial network including a generator and a discriminator, the generator and the discriminator being artificial neuronal networks, the method including the following:
training the discriminator, the training of the discriminator including adapting a parameter of the discriminator as a function of a loss function, the loss function including a term that represents a violation of a Lipschitz condition as a function of a first input datum and a second input datum, and as a function of: (i) a first output of the discriminator when processing the first input datum, and (ii) a second output of the discriminator when processing the second input datum, the second input datum being created starting from the first input datum by applying a method of a virtual adversarial training.

2. The method as recited in claim 1, wherein the first input datum is either retrieved from a data memory for real training data or generated using the generator.

3. The method as recited in claim 1, wherein the first input datum is changed into its adversarial direction for creation while applying the method of the virtual adversarial training, the adversarial direction being approximated by applying a power iteration.

4. The method as recited in claim 1, wherein the method includes a first step of training the generator and a second step of training the generator, multiple iterations of the step of the training of the discriminator being carried out between the first step of training the generator and the second step of training the generator.

5. The method as recited in claim 1, wherein the discriminator is near 1-Lipschitz and near optimal.

6. A generative adversarial network, comprising:
a generator; and
a discriminator;
wherein the generator and the discriminator are artificial neuronal networks, the discriminator being trained by adapting a parameter of the discriminator as a function of a loss function, the loss function including a term that represents a violation of a Lipschitz condition as a function of a first input datum and a second input datum, and as a function of: (i) a first output of the discriminator when processing the first input datum, and (ii) a second output of the discriminator when processing the second input datum, the second input datum being created starting from the first input datum by applying a method of a virtual adversarial training.

7. The generative adversarial network as recited in claim 6, wherein the discriminator is near 1-Lipschitz and near optimal.

8. A non-transitory machine-readable memory medium on which is stored a computer program for training an artificial neuronal network including a generator and a discriminator, the computer program, when executed by a computer, causing the computer to perform:
training the discriminator, the training of the discriminator including adapting a parameter of the discriminator as a function of a loss function, the loss function including a term that represents a violation of a Lipschitz condition as a function of a first input datum and a second input datum, and as a function of: (i) a first output of the discriminator when processing the first input datum, and (ii) a second output of the discriminator when processing the second input datum, the second input datum being created starting from the first input datum by applying a method of a virtual adversarial training.

9. A device configured to train a Wasserstein generative adversarial network, the generative adversarial network including a generator and a discriminator, the generator and the discriminator being artificial neuronal networks, the device configured to:
train the discriminator, the training of the discriminator including adapting a parameter of the discriminator as a function of a loss function, the loss function including a term that represents a violation of a Lipschitz condition as a function of a first input datum and a second input datum, and as a function of: (i) a first output of the discriminator when processing the first input datum, and (ii) a second output of the discriminator when processing the second input datum, the second input datum being created starting from the first input datum by applying a method of a virtual adversarial training.

* * * * *